(12) United States Patent
Ishikawa

(10) Patent No.: US 11,144,026 B2
(45) Date of Patent: Oct. 12, 2021

(54) PLANT-MONITORING AUTONOMOUS CONTROL SYSTEM

(71) Applicant: Mitsubishi Electric Corporation, Tokyo (JP)

(72) Inventor: Tomohide Ishikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 149 days.

(21) Appl. No.: 16/310,066

(22) PCT Filed: Jun. 24, 2016

(86) PCT No.: PCT/JP2016/068766
§ 371 (c)(1),
(2) Date: Dec. 14, 2018

(87) PCT Pub. No.: WO2017/221392
PCT Pub. Date: Dec. 28, 2017

(65) Prior Publication Data
US 2019/0332079 A1  Oct. 31, 2019

(51) Int. Cl.
*G05B 19/042* (2006.01)

(52) U.S. Cl.
CPC ........... *G05B 19/0428* (2013.01); *G05B 2219/25228* (2013.01); *G05B 2219/25419* (2013.01)

(58) Field of Classification Search
CPC .................................................. G05B 19/0428
See application file for complete search history.

(56) References Cited

U.S. PATENT DOCUMENTS

| 5,297,144 A | * | 3/1994 | Gilbert | .......... | H04W 74/06 |
| | | | | | 370/346 |
| 2002/0015184 A1 | * | 2/2002 | Hatakeyama | .......... | G06K 15/16 |
| | | | | | 358/1.16 |

(Continued)

FOREIGN PATENT DOCUMENTS

DE   195 04 291 A1   8/1996
EP   2 801 877 A2   11/2014

(Continued)

OTHER PUBLICATIONS

Extended European Search Report dated Jul. 2, 2019, issued by the European Patent Office in corresponding European Application No. 16906309.6. (8 pages).

(Continued)

*Primary Examiner* — Santosh R Poudel
(74) *Attorney, Agent, or Firm* — Buchanan Ingersoll & Rooney PC

(57) ABSTRACT

To obtain a plant-monitoring autonomous control system which performs autonomous distributed control without using an advanced calculation processing unit such as a CPU. A plant-monitoring autonomous control system is provided with a control network which mutually connects: input nodes for receiving an input signal from a control target apparatus and transmitting the input signal to the control network; a calculation node having calculation circuits, and for transmitting, to the control network, a result obtained by performing calculation processing on data received from the input node; and an output node for outputting, to the control target apparatus, data received from the calculation node.

19 Claims, 8 Drawing Sheets

(56) References Cited

U.S. PATENT DOCUMENTS

| | | | |
|---|---|---|---|
| 2009/0105850 A1* | 4/2009 | Miyata | H04L 12/40169 700/28 |
| 2011/0087396 A1 | 4/2011 | Eregen et al. | |
| 2014/0336784 A1 | 11/2014 | Senda et al. | |
| 2015/0185716 A1* | 7/2015 | Wichmann | F01K 23/101 700/287 |
| 2016/0246292 A1* | 8/2016 | Lawson | G06F 1/12 |

FOREIGN PATENT DOCUMENTS

| | | |
|---|---|---|
| JP | H03257504 A | 11/1991 |
| JP | 2000003214 A | 1/2000 |
| JP | 2013073503 A | 4/2013 |

OTHER PUBLICATIONS

International Search Report (PCT/ISA/210) dated Sep. 13, 2016, by the Japan Patent Office as the International Searching Authority for International Application No. PCT/JP2016/068766.
Written Opinion (PCT/ISA/237) dated Sep. 13, 2016, by the Japan Patent Office as the International Searching Authority for International Application No. PCT/JP2016/068766.

* cited by examiner

FIG. 3

| NET ID | TRANSMISSION SOURCE | | TRANSMISSION DESTINATION | |
|---|---|---|---|---|
| | NODE | TERMINAL | NODE | TERMINAL |
| Net1 | INPUT NODE 10 | 11 | CALCULATION NODE 20 | 21 |
| Net2 | INPUT NODE 10 | 12 | CALCULATION NODE 20 | 22 |
| | | | | 25 |
| Net3 | INPUT NODE 30 | 31 | CALCULATION NODE 20 | 26 |
| Net4 | CALCULATION NODE 20 | 23 | CALCULATION NODE 20 | 24 |
| Net5 | INPUT NODE 20 | 28 | OUTPUT NODE 40 | 41 |
| Net6 | INPUT NODE 30 | 32 | OUTPUT NODE 40 | 42 |

FIG. 4

| ORDER | TRANSMISSION SOURCE | COMMUNICATION DATA | | |
|---|---|---|---|---|
| 1 ↓ 10 | SCHEDULER 90 | INPUT NODE 10 | Net1 | Net2 |
| | INPUT NODE 10 | Net1 | TERMINAL 11 DATA | |
| | INPUT NODE 10 | Net2 | TERMINAL 12 DATA | |
| | SCHEDULER 90 | INPUT NODE 30 | Net3 | |
| | INPUT NODE 30 | Net3 | TERMINAL 31 DATA | |
| | SCHEDULER 90 | CALCULATION NODE 20 | Net4 | Net5 |
| | CALCULATION NODE 20 | Net4 | TERMINAL 23 DATA | |
| | CALCULATION NODE 20 | Net5 | TERMINAL 28 DATA | |
| | SCHEDULER 90 | INPUT NODE 30 | Net6 | |
| | INPUT NODE 30 | Net6 | TERMINAL 32 DATA | |

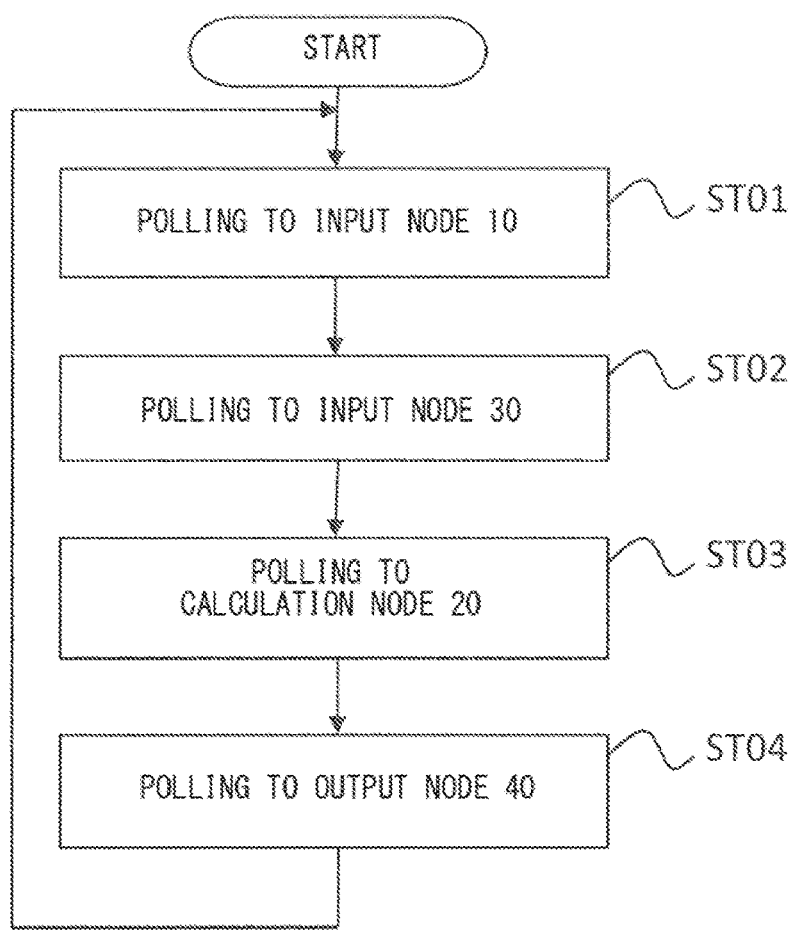

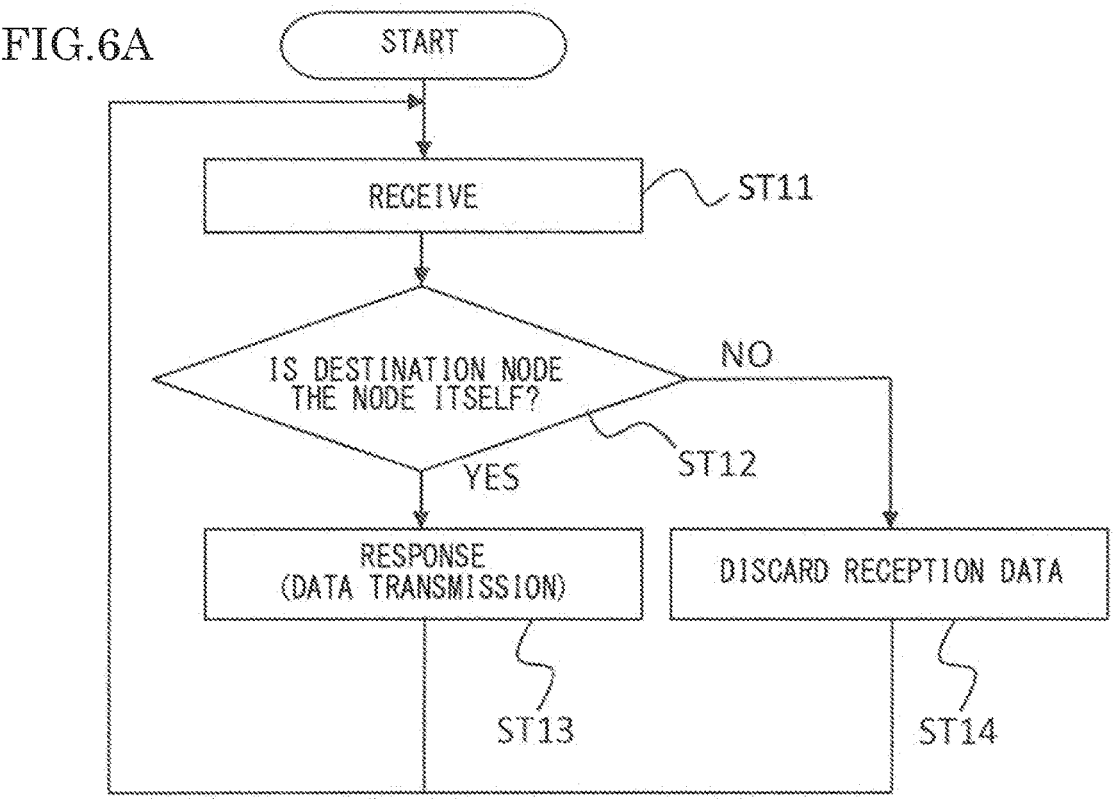

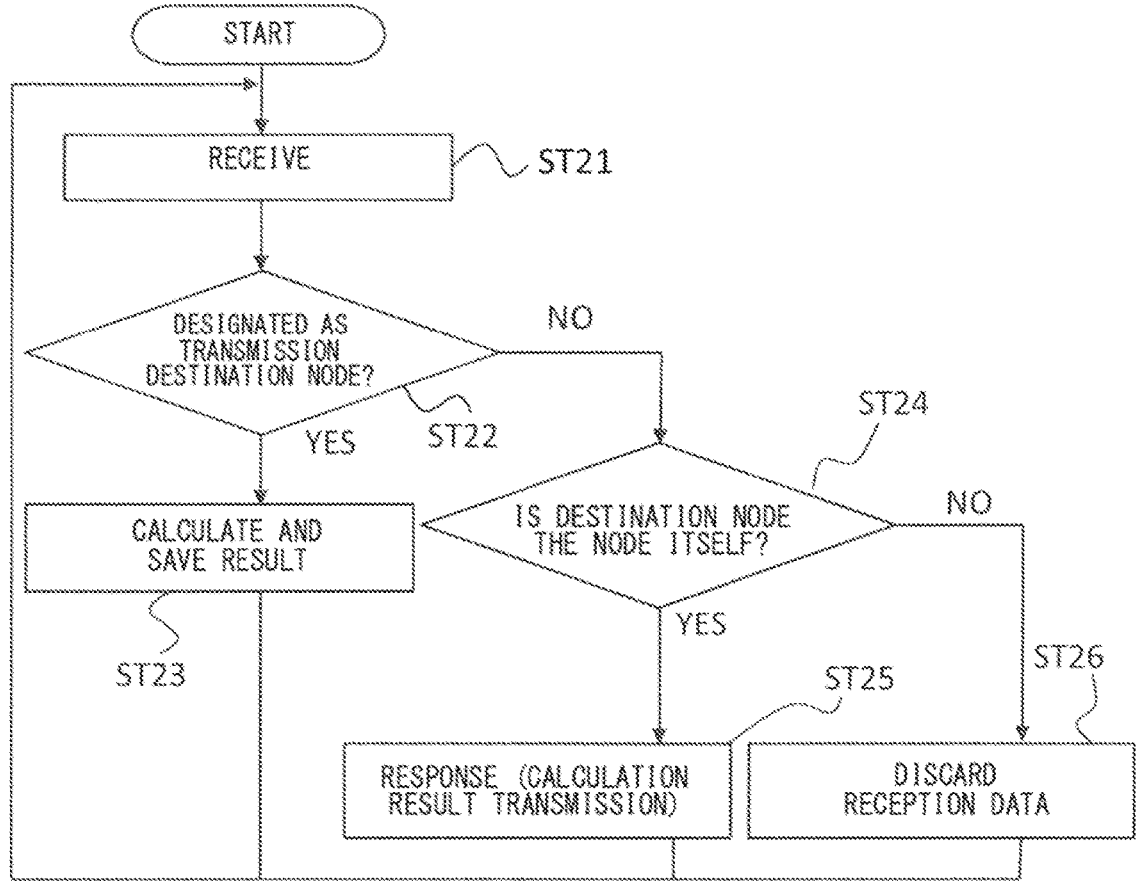

| TRANSMISSION SOURCE | RECEPTION DATA | |
|---|---|---|
| CALCULATION NODE 20 | Net5 | TERMINAL 28 DATA |
| INPUT NODE 30 | Net6 | TERMINAL 32 DATA |

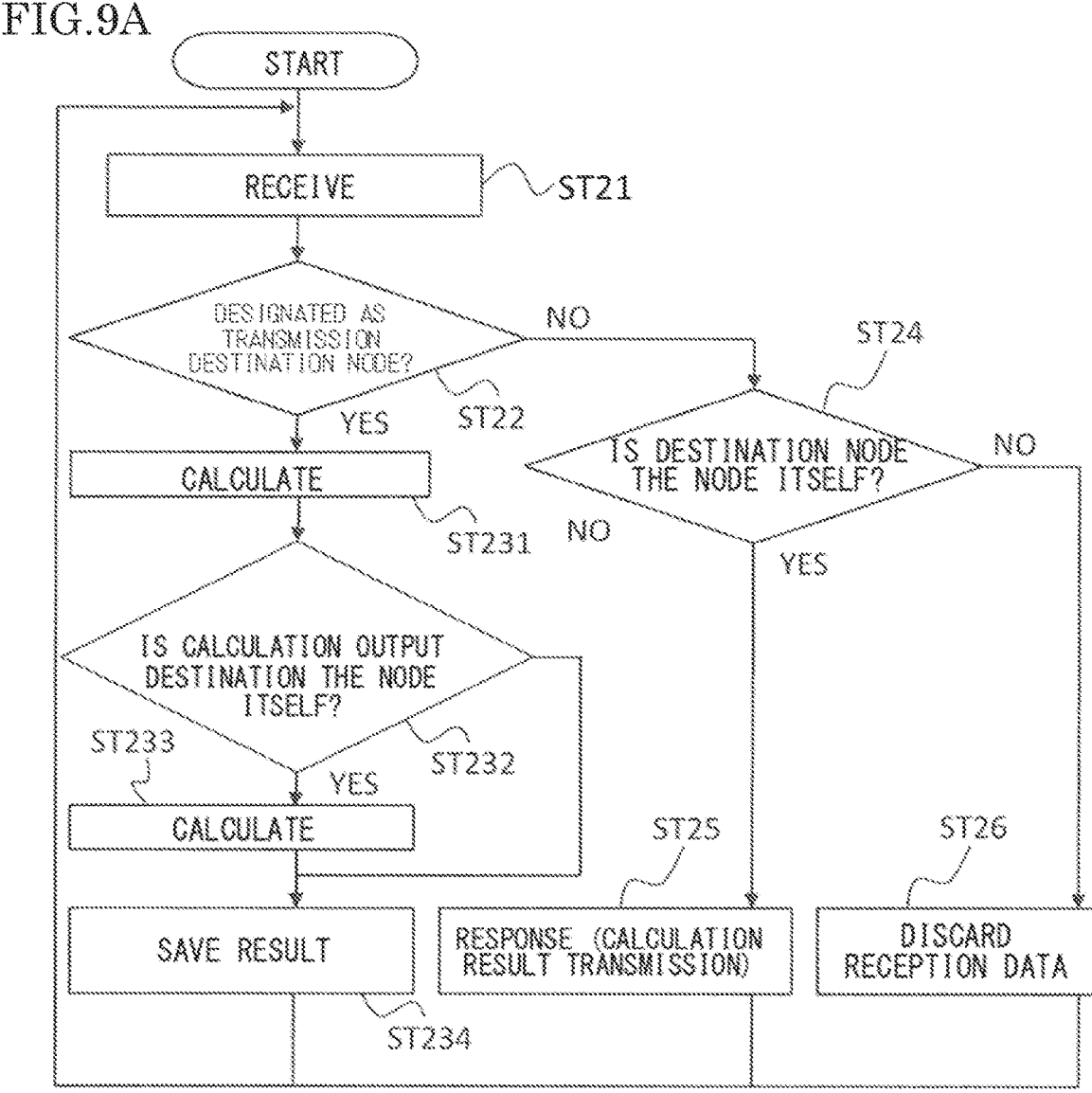

FIG. 10

| ORDER | TRANSMISSION SOURCE | COMMUNICATION DATA | | |
|---|---|---|---|---|
| 1 ↓ 11 | SCHEDULER 90 | INPUT NODE 10 | Net1 | Net2 |
| | INPUT NODE 10 | Net1 | TERMINAL 11 DATA | DIAGNOSIS |
| | INPUT NODE 10 | Net2 | TERMINAL 12 DATA | DIAGNOSIS |
| | SCHEDULER 90 | INPUT NODE 30 | Net3 | |
| | INPUT NODE 30 | Net3 | TERMINAL 31 DATA | DIAGNOSIS |
| | SCHEDULER 90 | CALCULATION NODE 20 | Net4 | Net5 |
| | CALCULATION NODE 20 | Net4 | TERMINAL 23 DATA | DIAGNOSIS |
| | CALCULATION NODE 20 | Net5 | TERMINAL 28 DATA | DIAGNOSIS |
| | SCHEDULER 90 | INPUT NODE 30 | Net6 | |
| | INPUT NODE 30 | Net6 | TERMINAL 32 DATA | DIAGNOSIS |
| | SCHEDULER 90 | OUTPUT NODE 40 | DIAGNOSIS RESULT | |

PLANT-MONITORING AUTONOMOUS CONTROL SYSTEM

TECHNICAL FIELD

The present invention relates to a plant-monitoring autonomous control system for performing monitoring control of a plant facility such as a nuclear power plant.

BACKGROUND ART

In recent years, digital control systems have been applied to control devices for monitoring control in plant facilities such as newly-constructed nuclear power plants. In such a conventional digital control system, a centralized control method is employed. Thus, an input/output device serving as an interface for a control target apparatus, a centralized control device for performing complicated control logic calculation, and a relay apparatus for connecting these are required regardless of the scale of the control system. Therefore, the system configuration of a small-scale control system is more complicated than that of an analog control system, thus causing decreased reliability. In addition, the entire system is influenced by an abnormality in the centralized control device, which also causes decreased reliability.

Thus, a distributed control system has been proposed that has controlling computers which are connected in a distributed manner, which each download a controlling program in advance, and which each include independent control means for controlling by itself a control target apparatus when data necessary for control is set (see Patent Document 1, for example).

CITATION LIST

Patent Document

Patent Document 1: Japanese Laid-Open Patent Publication No. 2000-3214 (paragraph 0023 to paragraph 0034, FIG. 1 to FIG. 3)

SUMMARY OF THE INVENTION

Problems to be Solved by the Invention

In the distributed control system of Patent Document 1, each controlling computer that controls a control target apparatus includes a memory for storing a monitoring controlling program, and a monitor-control unit implemented as a CPU which automatically controls a plant facility apparatus or the like. However, as for a small-scale system, use of an advanced calculation processing unit such as a CPU is not necessarily needed, but rather, has a problem of causing a complicated configuration, which leads to decreased reliability and increased cost.

The present invention has been made in order to solve the above problem. An object of the present invention is to obtain a plant-monitoring autonomous control system which performs autonomous distributed control without using an advanced calculation processing unit such as a CPU.

Solution to the Problems

A plant-monitoring autonomous control system of the present invention is a plant-monitoring autonomous control system for controlling one or a plurality of control target apparatuses, the plant-monitoring autonomous control system including: a plurality of nodes, of different kinds, being connected to one another through a control network; and a communication management device connected to the plurality of nodes via the control network, the communication management device being for sequentially transmitting to each of the nodes, in accordance with an order determined in advance, transmission instruction information which designates data and a transmission source node and a transmission destination node of the data, wherein each node is an input node for receiving an input signal from the control target apparatus and transmitting the input signal to the control network, a calculation node having a calculation circuit and for transmitting, to the control network, a result obtained by performing calculation processing on data received from the input node, or an output node for outputting, to the control target apparatus, data received from the calculation node, and a node designated as the transmission source node transmits the designated data together with the transmission instruction information, to a node designated as the transmission destination node.

Effect of the Invention

According to the plant-monitoring autonomous control system of the present invention, a control network which connects nodes which respectively perform processing of inputting, calculation, and outputting is provided, and thus, it is possible to obtain a plant-monitoring autonomous control system which performs autonomous distributed control without using an advanced calculation processing unit such as a CPU.

BRIEF DESCRIPTION OF THE DRAWINGS

FIG. 3 is a diagram describing transmission instruction information.

FIG. 4 is a diagram describing a sequence of communication data according to embodiment 1 of the present invention.

FIGS. 5A and 5B show diagrams describing operation of a scheduler according to embodiment 1 of the present invention, in which FIG. 5A is a flow chart showing operation of the scheduler and FIG. 5B is a diagram showing a sequence of transmission data transmitted by the scheduler.

FIGS. 6A and 6B show diagrams describing operation of an input node according to embodiment 1 of the present invention, in which FIG. 6A is a flow chart showing operation of the input node and FIG. 6B is a diagram showing a sequence of transmission data and reception data transmitted/received by the input node.

FIGS. 7A and 7B show diagrams describing operation of a calculation node according to embodiment 1 of the present invention, in which FIG. 7A is a flow chart showing operation of the calculation node and FIG. 7B is a diagram showing a sequence of transmission data and reception data transmitted/received by the calculation node.

FIGS. 8A and 8B show diagrams describing operation of an output node according to embodiment 1 of the present invention, in which FIG. 8A is a flow chart showing operation of the output node and FIG. 8B is a diagram showing a sequence of reception data received by the output node.

FIGS. 9A and 9B show diagrams describing operation of a calculation node according to embodiment 2 of the present invention, in which FIG. 9A is a flow chart showing operation of the calculation node and FIG. 9B is a diagram showing a sequence of transmission data and reception data transmitted/received by the calculation node.

FIG. 10 is a diagram describing a sequence of communication data according to embodiment 3 of the present invention.

DESCRIPTION OF EMBODIMENTS

Embodiment 1

Hereinafter, a plant-monitoring autonomous control system according to embodiment 1 of the present invention is described with reference to FIG. 1 to FIG. 8.

Figure 1:
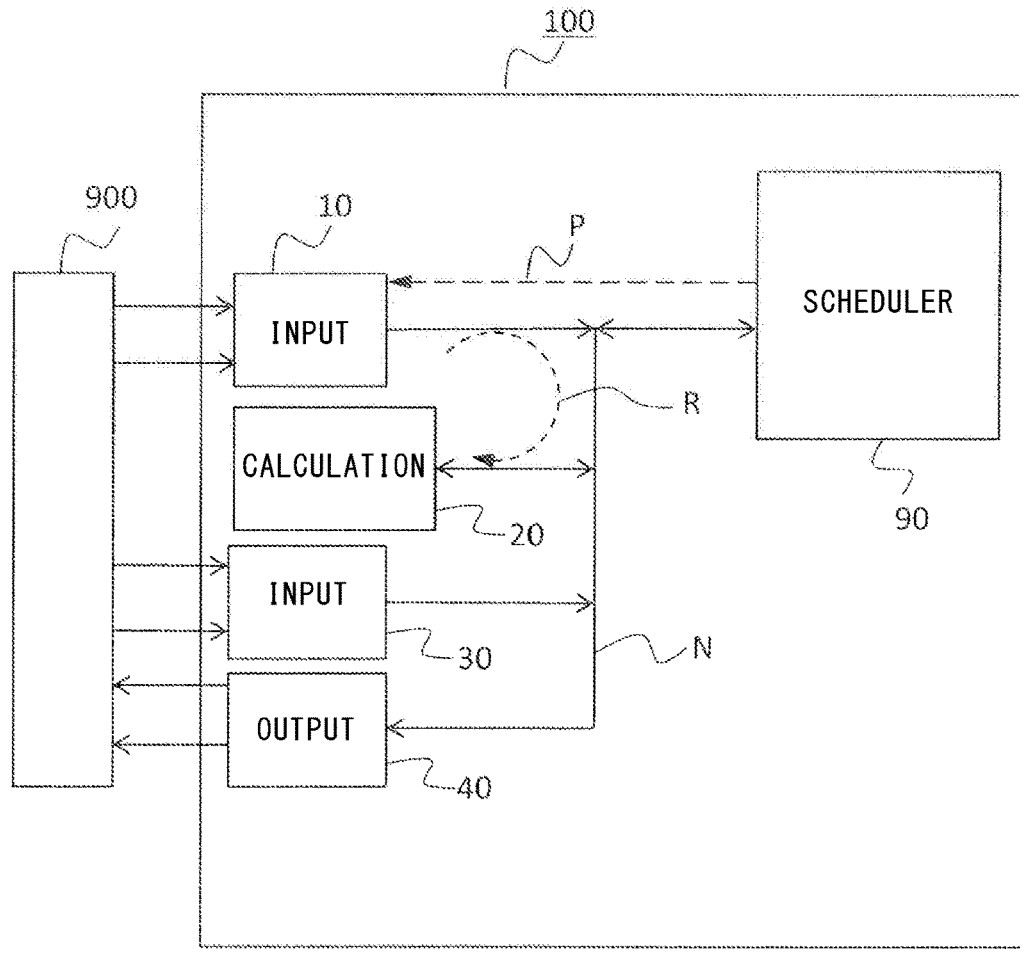
FIG. 1 is a configuration diagram of a plant-monitoring autonomous control system according to embodiment 1 of the present invention.

FIG. 1 is a configuration diagram of a plant-monitoring autonomous control system according to embodiment 1. A plant-monitoring autonomous control system 100 controls a control target apparatus 900 by an input node 10, a calculation node 20, an input node 30, and an output node 40 which are connected to one another through a control network N as shown in FIG. 1. Each node transmits/receives communication data through the transmission line of the control network N, and has a unique physical address set thereto. Each arrow on the control network N indicates the flow of a communication packet. Each of the input nodes 10 and 30 receives two different input signals from the control target apparatus 900 and transmits the input signals as communication data to the control network N. The calculation node 20 performs predetermined calculation processing on the input signals received from each of the input nodes 10 and 30, to generate a control signal, and transmits the control signal to the control network N. The output node 40 outputs, as output signals, the control signal received from the calculation node 20 and an input signal received from the input node 30, to the control target apparatus 900. As for the control target apparatus 900, a sensor, a switch, or the like serves as an input, and an alarm, an operation unit, a valve, a relay, or the like serves as an output.

A scheduler 90, i.e., a communication management device, which manages communication between nodes is connected to the control network N. The scheduler 90 sequentially transmits a polling signal P to each node in an order determined in advance, and the node that has received the polling signal P makes a response determined in advance. In FIG. 1, the input node 10, which has received the polling signal P, transmits a response signal R to the calculation node 20. The scheduler 90 transmits transmission instruction information (described later) together with the polling signal P, thereby managing the response destination for the node that has received the polling signal and the transmission instruction information, and transmission data to the response destination.

Figure 2:
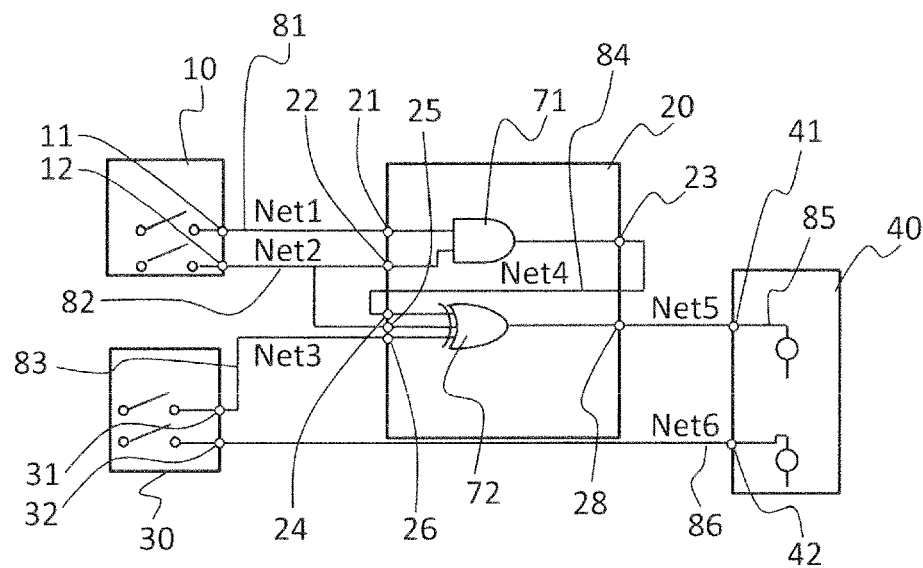
FIG. 2 is a logical circuit diagram of nodes in the plant-monitoring autonomous control system according to embodiment 1 of the present invention.

Next, each node and connection between the nodes are described in more detail. FIG. 2 is a logical circuit diagram of nodes in the plant-monitoring autonomous control system according to embodiment 1 of the present invention. In FIG. 2, the control network N shown in FIG. 1 is specifically indicated by wirings 81 to 86. The input node 10 includes two output terminals 11 and 12 which respectively correspond to two input signals. The calculation node 20 includes: two calculation circuits 71 and 72; input terminals 21 and 22 which receive inputs for the calculation circuit 71; input terminals 24 to 26 which receive inputs for the calculation circuit 72; an output terminal 23 which transmits an output of the calculation circuit 71; and an output terminal 28 which transmits an output of the calculation circuit 72. The input node 30 includes output terminals 31 and 32 which respectively correspond to two input signals. The output node 40 includes input terminals 41 and 42 which respectively correspond to two control signals. In each node, each input terminal or each output terminal corresponds to the kind of data that is communicated. Thus, each input terminal or each output terminal in each node corresponds to data that is transmitted/received.

The wirings 81, 82, 83, 84, 85, and 86 connect the output terminal 11 and the input terminal 21; the output terminal 12 and the input terminal 22; the output terminal 31 and the input terminal 26; the output terminal 23 and the input terminal 24; the output terminal 28 and the input terminal 41; and the output terminal 32 and the input terminal 42, respectively. Net1, Net2, and the like shown in FIG. 2 indicate identifiers of pieces of transmission instruction information (described later) that correspond to the wirings, respectively.

It should be noted that the connection relationships among nodes and the calculation circuits shown in FIG. 1 and FIG. 2 are merely examples and the present invention is not limited thereto.

FIG. 3 is a diagram describing transmission instruction information transmitted to each node by the scheduler 90. In the present invention, the transmission instruction information identified by an identifier (Net ID) designates: a transmission source node and a transmission source output terminal; and a transmission destination node and a transmission destination input terminal, in each communication. The reference character in "terminal" in FIG. 3 is the reference character of the corresponding input terminal or output terminal shown in FIG. 2. For example, with respect to transmission instruction information Net1, the transmission source is the output terminal 11 of the input node 10, and the transmission destination is the input terminal 21 of the calculation node 20. As described above, each input terminal or each output terminal of each node corresponds to the data to be communicated, and thus, if a transmission source and a transmission destination are designated by the transmission instruction information, the data to be transmitted/received can be designated.

In the plant-monitoring autonomous control system 100 of the present embodiment, the scheduler 90 has prestored therein all pieces of transmission instruction information and the transmission order thereof. In addition, each node has prestored therein, as transmission instruction information for checking, transmission instruction information that designates the node itself as a transmission source or as a transmission destination.

Next, operation is described. FIG. 4 is a diagram describing a sequence of communication data according to the present embodiment 1, and shows that communication is performed in the order starting from the top. The reason why a node name is included in the communication data in the case where the transmission source is the scheduler 90 is that the scheduler 90 also transmits the physical address of the destination node. "Terminal 11 data" in FIG. 4 indicates that the data is outputted from the output terminal 11, and the same mutatis mutandis applies to "terminal 12 data", "terminal 31 data", and the like. The scheduler 90 transmits the physical address of the destination node and transmission instruction information corresponding to the destination node. The node that serves as the transmission source adds the designated transmission data to the transmission instruction information received from the scheduler 90, and transmits the resultant transmission instruction information to the designated transmission destination. For example, as for the second communication data from the top, the transmission source of the transmission instruction information Net1 is the output terminal 11 of the input node 10, and the transmission destination is the input terminal 21 of the calculation node 20. Thus, the input node 10 designated as the transmission source node transmits the terminal 11 data together with the transmission instruction information Net1, to the input terminal 21 of the calculation node 20.

FIGS. 5A and 5B show diagrams describing operation of the scheduler 90, in which FIG. 5A is a flow chart showing operation of the scheduler 90 and FIG. 5B is a diagram showing a sequence of transmission data transmitted by the scheduler 90. First, the scheduler 90 polls the input node 10 and transmits a destination node address, that is, the physical address of the input node 10, and transmission instruction information Net' and Net2, thereby causing the input node 10 to make a response (ST01). Next, the scheduler 90 polls the input node 30 and transmits the physical address of the input node 30 and transmission instruction information Net3 (ST02). Next, the scheduler 90 polls the calculation node 20 and transmits the physical address of the calculation node 20 and transmission instruction information Net4 and Net5 (ST03). Next, the scheduler 90 polls the output node 40 and transmits the physical address of the output node 40 and transmission instruction information Net6 (ST04). After ST04, the operation returns to ST01, and by repeating ST01 to ST04, the scheduler 90 continues polling to each node and transmitting transmission instruction information. The scheduler 90 only performs communication management by performing polling and transmission of transmission instruction information as described above, and does not receive data transmitted by each node.

FIGS. 6A and 6B show diagrams describing operation of the input node 10, in which FIG. 6A is a flow chart showing operation of the input node 10 and FIG. 6B is a diagram showing data transmitted/received by the input node 10. First, the input node 10 receives a polling signal P from the scheduler 90 (ST11). As described above, when the scheduler 90 performs polling, the scheduler 90 also transmits a destination node address and transmission instruction information, and thus, the input node 10 also receives these. Next, the input node 10 determines whether the received destination node address is the physical address of the input node 10 (ST12). When the destination is the input node 10, the input node 10 transmits, as a response to the polling, data designated by the received transmission instruction information, i.e., data that corresponds to the output terminal designated as the transmission source by the transmission instruction information, to the designated transmission destination together with the transmission instruction information (ST13). After having made a response to the polling, the input node 10 waits until receiving the next polling signal P. When having received a plurality of pieces of transmission instruction information, the input node 10 performs transmission of data successively in accordance with the received order of the transmission instruction information. When the destination is not the input node 10 in ST12, the input node 10 discards the received data (ST14), and waits until receiving the next polling signal P.

Specifically, since the destination node for the reception data is the input node 10 in FIG. 6B, the input node 10 transmits, as response (transmission) data corresponding to the polling, the terminal 11 data which is the data designated by the transmission instruction information Net' in ST12, to the input terminal 21 of the calculation node 20 together with the transmission instruction information Net1, and then, transmits the terminal 12 data designated by the transmission instruction information Net2, to the input terminal 22 of the calculation node 20 together with the transmission instruction information Net2.

In the present embodiment, the input node 10 determines whether the communication is directed to the input node 10 on the basis of the destination node address transmitted by the scheduler 90. Since the destination node address and the transmission source node designated by the transmission instruction information are the same with each other, the input node 10 may determine whether the communication is directed to the input node 10 by checking whether the received transmission instruction information designates the input node 10 as the transmission source node.

The operation of the input node 10 has been described here, but since the operation of the input node 30 is similar to that of the input node 10, description thereof is omitted.

FIGS. 7A and 7B show diagrams describing operation of the calculation node 20, in which FIG. 7A is a flow chart showing operation of the calculation node 20 and FIG. 7B is a diagram showing data transmitted/received by the calculation node 20. First, the calculation node 20 receives a polling signal P from the scheduler 90 or transmission data from a node (ST21). Here, when receiving a polling signal P from the scheduler 90, the calculation node 20 also receives a destination node address and transmission instruction information. When receiving transmission data from a node, the calculation node 20 also receives transmission instruction information. Next, the calculation node 20 compares the received transmission instruction information with the transmission instruction information for checking pre-stored therein, and determines whether the calculation node 20 is designated as the transmission destination node (ST22). When the calculation node 20 is designated as the transmission destination node, the calculation node 20 executes calculation on the basis of the received transmission data, saves the result, and waits (ST23).

When the calculation node 20 is not designated as the transmission destination node and has received a destination node address from the scheduler 90, the calculation node 20 determines whether the received destination node address is the physical address of the calculation node 20 (ST24). When the destination is the calculation node 20, the calculation node 20 reads out saved calculation result and transmits the calculation result together with the received transmission instruction information, to the designated transmission destination (ST25). When having received a plurality of pieces of transmission instruction information, the calculation node 20 performs transmission of data successively in accordance with the received order of the transmission instruction information. When the destination node is not the calculation node 20 and no destination node address has been received, the calculation node 20 discards the reception data, and waits until the next communication (ST26).

In ST24, similar to the case of the input node 10 described above, the calculation node 20 may determine whether the communication is directed to the calculation node 20 by checking whether the calculation node 20 is designated as the transmission source node.

Specifically, in FIG. 7B, the first to the third and the fifth reception data have the transmission instruction information Net1, Net2, Net3, and Net4 which designate the calculation node 20 as the transmission destination node. Therefore, when these are received, calculation processing is performed in ST23. As for the fourth reception data, the destination node of the reception data is the calculation node 20, and thus, a response (calculation result transmission) is made through ST25 or ST26. Since the transmission instruction information is Net4 and Net5, in response to the polling, terminal 23 data is transmitted to the input terminal 24 of the calculation node 20, together with the transmission instruction information Net4, and subsequently, terminal 28 data is transmitted to the input terminal 41 of the output node 40, together with the transmission instruction information Net5.

Figures 8A, 8B:
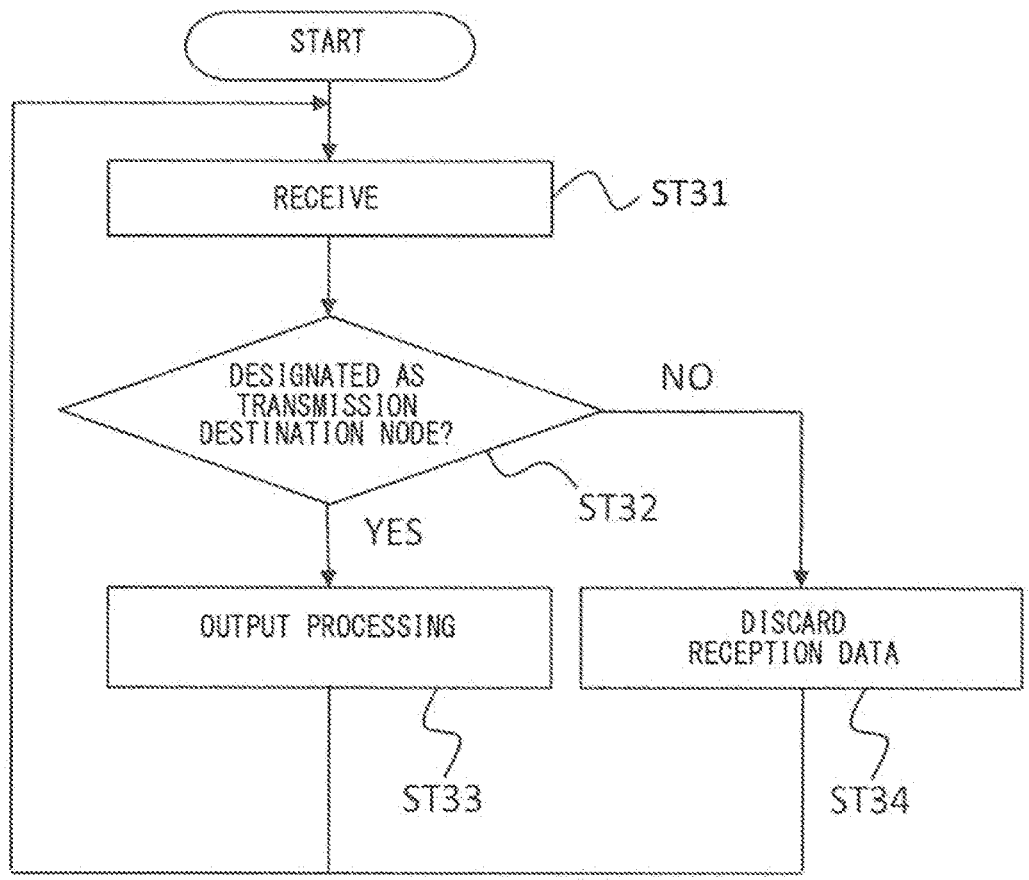

FIGS. 8A and 8B show diagrams describing operation of the output node 40, in which FIG. 8A is a flow chart showing operation of the output node 40 and FIG. 8B is a diagram showing data transmitted/received by the output node 40. First, the output node 40 receives transmission instruction information and transmission data from a node (ST31). Next, the output node 40 compares the received transmission instruction information with the transmission instruction information for checking prestored therein, and determines whether the output node 40 is designated as the transmission destination node (ST32). When the output node 40 is designated as the transmission destination node, the output node 40 executes output processing in accordance with the content of the received transmission data (ST33), and waits until the next communication. When the output node 40 is not designated as the transmission destination node in ST32, the output node 40 discards the reception data and waits until the next communication (ST34).

When the output node 40 is not designated as the transmission destination in ST32, the output node 40 discards the received data (ST34), and waits until receiving the next communication.

Specifically, in FIG. 8B, the first and the second reception data have transmission instruction information Net5 and Net6 which designate the output node 40 as the transmission destination node. When these are received, output processing is performed in ST33.

According to embodiment 1, the input node, the calculation node, and the output node each having a simple function are connected to each other through a control network, and communication between nodes and the communication schedule are managed by the scheduler. Each of the nodes and the scheduler needs only to prestore transmission instruction information therein, and autonomously operates after the system is activated. Thus, without using an advanced calculation processing unit such as a CPU, a plant-monitoring autonomous control system that performs autonomous distributed control can be obtained.

Any change of the system configuration can be realized only by changing the nodes and changing the transmission instruction information, and changing of hard wires as in an analog control system is not necessary. Therefore, the system configuration can be easily changed, and is highly flexible.

In changing the transmission instruction information, for the Net ID which is the identifier of the transmission instruction information which designates transmission data, identification information that is used in general-purpose wiring CAD can be used, and an arbitrary value can be selected. Thus, an existing user designing environment can be utilized. Therefore, it is not necessary to construct a new designing environment.

In addition, the unit of the control network is small-scaled, and reliability can be easily improved due to redundancy of each control network unit.

The control network unit itself has a simple configuration, and combining a plurality of control networks is also easy. Thus, through such combinations, control networks can be applied not only to small-scale systems but also to middle-scale and large-scale systems.

Embodiment 2

In the following, embodiment 2 of the present invention is described with reference to FIGS. 9A and 9B. Components that are the same as or correspond to those in FIG. 1 to FIG. 8B are denoted by the same reference characters, and description thereof is omitted.

In embodiment 2, the operation of the calculation node 20 is different. Embodiment 2 assumes a case where the calculation node 20 includes a plurality of calculation circuits, wherein the output of one of the calculation circuits serves as the input for another of the calculation circuits.

FIGS. 9A and 9B show diagrams describing operation of the calculation node 20 according to embodiment 2, in which FIG. 9A is a flow chart showing operation of the calculation node 20 and FIG. 9B is a diagram showing data transmitted/received by the calculation node 20. First, similar to embodiment 1, the calculation node 20 receives data from the scheduler 90 or a node (ST21). Then, the calculation node 20 compares the received transmission instruction information with the transmission instruction information for checking prestored therein, and determines whether the calculation node 20 is designated as the transmission destination node (ST22). When the calculation node 20 is designated as the transmission destination node, the calculation node 20 executes calculation by use of one of the calculation circuits on the basis of the received data (ST231). Next, the calculation node 20 determines whether the calculation node 20 is the calculation output destination on the basis of the transmission destination designated by the transmission instruction information (ST232). When the calculation node 20 is designated as the calculation output destination, the calculation node 20 performs calculation successively by use of another of the calculation circuits (ST233), and saves the result (ST234). When the calculation node 20 is not the calculation output destination, the calculation node 20 saves the calculation result obtained in ST231 as is.

When the calculation node 20 is not designated as the transmission destination node and has received a destination node address from the scheduler 90, the calculation node 20 determines whether the received destination node address is the physical address of the calculation node 20 (ST24), as in embodiment 1. When the destination is the calculation node 20, the calculation node 20 reads out saved calculation result, and transmits the calculation result together with the received transmission instruction information, to the designated transmission destination (ST25). When having received a plurality of pieces of transmission instruction information, the calculation node 20 performs transmission of data successively in accordance with the received order of the transmission instruction information. When the destination node is not the calculation node 20 and no destination node address has been received, the calculation node 20 discards the reception data, and waits until the next communication (ST26).

Specifically, in FIG. 9B, the reception data of the calculation node 20 is the same as that in embodiment 1. As for response (transmission) data, different from embodiment 1, the terminal 23 data and the transmission instruction information Net4 are not transmitted. As shown in FIG. 2 and FIG. 3, the transmission instruction information Net4 designates the terminal 23 data, which is the output of the calculation circuit 71, as the transmission data, and designates the input terminal 24 of the calculation node 20 as the transmission destination, and the processing of ST232, ST233, and ST234 is performed. Thus, in the present embodiment, the calculation node 20 directly inputs the output of the calculation circuit 71 to the calculation circuit 72, not via the control network N, and executes calculation in the calculation circuit 72. In the configuration of the present embodiment, the output of the calculation circuit 71 is directly inputted to the calculation circuit 72, but a configuration may be employed in which: the output of the calculation circuit 71 is temporarily saved in a storage device (not shown); and when calculation is performed by the calculation circuit 72, the output is read out. In a case where three or more calculation circuits are provided and generate a plurality of calculation results that are to be temporarily saved, if the calculation results are saved together with transmission instruction information, a calculation result of interest can be retrieved by using the identifier of the transmission instruction information as a key when the calculation result of interest is to be read out.

According to embodiment 2, effects similar to those according to embodiment 1 can be obtained.

In addition, in the operation of the calculation node, when the transmission source and the transmission destination are the same node, the output of the calculation circuit that performs calculation first is inputted, not via the control network, to the calculation circuit that performs calculation next. Thus, the communication data amount in the control network can be reduced. In addition, wirings can be reduced.

Embodiment 3

In the following, embodiment 3 of the present invention is described with reference to FIG. 10. Components that are the same as or correspond to those in FIG. 1 to FIG. 8 are denoted by the same reference characters, and description thereof is omitted. FIG. 10 is a diagram describing a sequence of communication data according to embodiment 3.

In embodiment 3, when each node transmits data, diagnostic data indicating the state of the node is added. The scheduler 90 monitors all communication data, and can obtain diagnostic information not only per node, but also per wiring, i.e., per transmission instruction information. The scheduler has an alarm notification function, and notifies a user of a diagnosis result obtained by determining the state of the system on the basis of each piece of diagnostic information. In FIG. 10, in the eleventh communication, the scheduler 90 transmits a diagnosis result to the output node 40. The output node 40 outputs the received diagnosis result to the outside. The other configurations are the same as those in embodiment 1, and description thereof is omitted.

According to embodiment 3, effects similar to those according to embodiment 1 can be obtained.

Further, since each node transmits diagnostic information of the node, and the scheduler causes a result obtained by monitoring each piece of diagnostic information, to be outputted to the outside. Thus, the user can understand the state of the system at appropriate timings.

It should be noted that, within the scope of the present invention, the above embodiments may be freely combined with each other, or each of the above embodiments may be modified or simplified as appropriate.

DESCRIPTION OF THE REFERENCE CHARACTERS 10, 30 input node
20 calculation node
40 output node
11, 12, 23, 28, 31, 32 output terminal
21, 22, 24, 25, 26, 41, 42 input terminal
71, 72 calculation circuit
81 to 86 wiring
90 scheduler
100 plant-monitoring autonomous control system
900 control target apparatus
P polling signal
R response signal
N control network

The invention claimed is:

1. A plant-monitoring autonomous control system for controlling one or a plurality of control target apparatuses, the plant-monitoring autonomous control system comprising:
   a plurality of nodes, of different kinds, being connected to one another through a control network, wherein the plurality of nodes are different from the plurality of control target apparatuses; and
   a communication management device connected to the plurality of nodes via the control network, the communication management device being for sequentially transmitting to each of the nodes, in accordance with an order determined in advance, transmission instruction information which designates data to be transmitted by designating a transmission source node, a physical terminal of a plurality of physical terminals of the transmission source node, and a transmission destination node, wherein
   the plurality of nodes includes:
      at least one input node for receiving an input signal from the control target apparatus and transmitting the input signal to the control network,
      at least one calculation node having a calculation circuit and for transmitting, to the control network, a result obtained by performing calculation processing on data received from the input node, and
      at least one output node for outputting, to the control target apparatus, data received from the calculation node,
   wherein a node, of the plurality of nodes, designated as the transmission source node by the transmission instruction information transmits the data designated to be transmitted together with the transmission instruction information, to a node, of the plurality of nodes, designated as the transmission destination node.

2. The plant-monitoring autonomous control system according to claim 1, wherein
   the calculation node comprises a plurality of calculation circuits, and
   when an output of one of the calculation circuits serves as an input for another of the calculation circuits, the output of the one of the calculation circuits is inputted to the another of the calculation circuits, not via the control network.

3. The plant-monitoring autonomous control system according to claim 2, wherein
   the communication management device transmits the transmission instruction information together with a polling signal to each of the nodes, and the node designated as the transmission source node transmits, in response to the polling signal, the data designated to be transmitted to the node designated as the transmission destination node.

4. The plant-monitoring autonomous control system according to claim 2, wherein
when transmitting the data designated to be transmitted, the node adds, to the data designated to be transmitted, diagnostic information indicating a state of the node, and
the communication management device monitors the diagnostic information.

5. The plant-monitoring autonomous control system according to claim 2, wherein
each node has prestored therein, as transmission instruction information for checking, transmission instruction information that designates the node as the transmission source node or the transmission destination node, and
when having received the transmission instruction information, the node checks the received transmission instruction information against the transmission instruction information for checking, thereby determining whether the node is designated as the transmission destination node or the transmission source node.

6. The plant-monitoring autonomous control system according to claim 2, wherein
each node has a plurality of physical terminals for each of which corresponding data is determined in advance, and
the transmission instruction information designates a physical terminal, thereby designating data that is to be transmitted by the transmission source node.

7. The plant-monitoring autonomous control system according to claim 1, wherein
the communication management device transmits the transmission instruction information together with a polling signal to each of the nodes, and
the node designated as the transmission source node transmits, in response to the polling signal, the data designated to be transmitted to the node designated as the transmission destination node.

8. The plant-monitoring autonomous control system according to claim 7, wherein
when transmitting the data designated to be transmitted, the node adds, to the data designated to be transmitted, diagnostic information indicating a state of the node, and
the communication management device monitors the diagnostic information.

9. The plant-monitoring autonomous control system according to claim 7, wherein
each node has prestored therein, as transmission instruction information for checking, transmission instruction information that designates the node as the transmission source node or the transmission destination node, and
when having received the transmission instruction information, the node checks the received transmission instruction information against the transmission instruction information for checking, thereby determining whether the node is designated as the transmission destination node or the transmission source node.

10. The plant-monitoring autonomous control system according to claim 7, wherein
each node has a plurality of physical terminals for each of which corresponding data is determined in advance, and
the transmission instruction information designates a physical terminal, thereby designating data that is to be transmitted by the transmission source node.

11. The plant-monitoring autonomous control system according to claim 1, wherein
when transmitting the data designated to be transmitted, the node adds, to the data designated to be transmitted, diagnostic information indicating a state of the node, and
the communication management device monitors the diagnostic information.

12. The plant-monitoring autonomous control system according to claim 11, wherein
the communication management device has an alarm notification function, and announces a diagnosis result obtained by determining a state of the system on the basis of the diagnostic information.

13. The plant-monitoring autonomous control system according to claim 12, wherein
each node has prestored therein, as transmission instruction information for checking, transmission instruction information that designates the node as the transmission source node or the transmission destination node, and
when having received the transmission instruction information, the node checks the received transmission instruction information against the transmission instruction information for checking, thereby determining whether the node is designated as the transmission destination node or the transmission source node.

14. The plant-monitoring autonomous control system according to claim 12, wherein
each node has a plurality of physical terminals for each of which corresponding data is determined in advance, and
the transmission instruction information designates a physical terminal, thereby designating data that is to be transmitted by the transmission source node.

15. The plant-monitoring autonomous control system according to claim 11, wherein
each node has prestored therein, as transmission instruction information for checking, transmission instruction information that designates the node as the transmission source node or the transmission destination node, and
when having received the transmission instruction information, the node checks the received transmission instruction information against the transmission instruction information for checking, thereby determining whether the node is designated as the transmission destination node or the transmission source node.

16. The plant-monitoring autonomous control system according to claim 11, wherein
each node has a plurality of physical terminals for each of which corresponding data is determined in advance, and
the transmission instruction information designates a physical terminal, thereby designating data that is to be transmitted by the transmission source node.

17. The plant-monitoring autonomous control system according to claim 1, wherein
each node has prestored therein, as transmission instruction information for checking, transmission instruction information that designates the node as the transmission source node or the transmission destination node, and when having received the transmission instruction information, the node checks the received transmission instruction information against the transmission instruction information for checking, thereby determining whether the node is designated as the transmission destination node or the transmission source node.

18. The plant-monitoring autonomous control system according to claim 17, wherein each node has a plurality of physical terminals for each of which corresponding data is determined in advance, and the transmission instruction information designates a physical terminal, thereby designating data that is to be transmitted by the transmission source node.

19. The plant-monitoring autonomous control system according to claim 1, wherein each node has a plurality of physical terminals for each of which corresponding data is determined in advance, and the transmission instruction information designates a physical terminal, thereby designating data that is to be transmitted by the transmission source node.

* * * * *